June 8, 1965 R. M. WINNAN ETAL 3,187,371

HANGER ASSEMBLY

Filed June 11, 1962 3 Sheets-Sheet 1

INVENTORS
Russell M. Winnan
BY Henry L. Majeske
Fidler, Beardsley & Bradley
ATTORNEYS

HANGER ASSEMBLY

Filed June 11, 1962 3 Sheets-Sheet 2

INVENTORS
Russell M. Winnan
BY Henry L. Majeske
Fidler, Beardsley & Bradley
ATTORNEYS

HANGER ASSEMBLY

Filed June 11, 1962 3 Sheets-Sheet 3

INVENTORS
Russell M. Winnan
BY Henry L. Majeske
Fidler, Beardsley & Bradley
ATTORNEYS 3,187,371

HANGER ASSEMBLY

Russell M. Winnan, Miami, Fla., and Henry L. Majeske, Loda, Ill., assignors to American Screen Products Company, Chicago, Ill., a corporation of Florida Filed June 11, 1962, Ser. No. 201,491
3 Claims. (Cl. 16—105)

This invention relates to a hanger assembly for sliding doors and the like and is more particularly directed to new and improved pre-assembled hanger assemblies wherein the component parts thereof are retained in unitary relationship to facilitate handling, installing, and adjustment after installation.

In the U.S. Patent No. 3,011,209, issued December 5, 1961 for "Hanger Assembly For Sliding Doors" there is disclosed and claimed a door hanger assembly in which a hanger carrying a track-ridable wheeled trolley is pre-assembled with a door-attaching plate by tabs slidable in notches formed in the hanger and wherein, in one embodiment of the invention, a cam member accessible through an aperture in the hanger is provided to adjust the height of the door relative to the track in which the wheels of the trolley ride.

To install one type of hanger assembly, disclosed in the cited patent, on a door, positioning flanges of the door attaching plate are placed over the upper edge of the door, and screws are then passed through openings in the attaching plate and are tightened to the point where there is still some freedom of lateral movement between the hanger and the attaching plate. With the hanger assembly thus attached to the door, the wheels of the trolley are inserted into the track and the door is suspended therefrom. The necessary vertical adjustment of the height of the door referred to is obtained by rotating a cam adjusting member with a screw driver or other tool which causes an eccentric lug of the cam member to travel transversely of an oblong opening in the hanger and thereby raise or lower the door through the attaching plate as necessary to obtain proper door height. When the exact door height is determined, the screws are tightened which causes corersponding serrations on the hanger and the attaching plate, respectively, to mesh and thus provide positive means to prevent shifting of parts and retain the door in adjusted position.

The present invention, in one aspect, comprises an improvement of the above-described hanger assembly of this patent characterized by the elimination of the requirement that the screws holding the attaching plate to the door be employed as a part of the door height vertical adjusting means. In other words, the attaching plate and hanger are pre-assembled, the attaching plate may be initially secured by the screws to the door, and vertical adjustment of the height of the door may be achieved thereafter without the door mounting screws being a factor in adjusting the door height.

It is, therefore, an object of the present invention to provide a new and improved hanger assembly for sliding doors.

Another object of the present invention is to provide a prefabricated hanger assembly, which may be handled as a unit, for sliding doors including means for holding the component parts together prior to and during installation.

Still another object of the present invention is to provide means for locking the assembly in its adjusted position to prevent any shifting of parts after the desired adjustment is made.

A further object of the present invention is to provide a prefabricated hanger assembly in which the attaching plate thereof is secured by screws to the door and in which the adjustment of the height of the door is thereafter achieved.

These and other objects, features and advantages of the present invention will become readily apparent to those versed in the art from a careful consideration of the following detailed description when considered in connection with the accompanying drawings, illustrating preferred embodiments of the present invention, wherein like reference numerals and characters refer to like and corresponding parts throughout the several views, and wherein.

Figure 1:
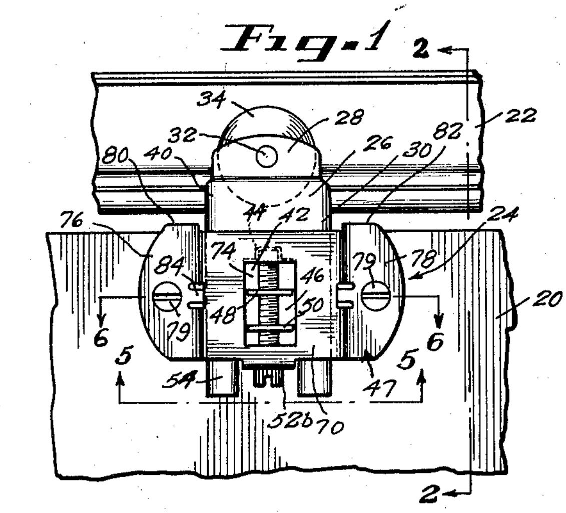
FIG. 1 is a front view in elevation of a door hanger assembly constructed in accordance with the present invention illustrated as mounted on a sliding door and in position for use on a track.
Figure 2:
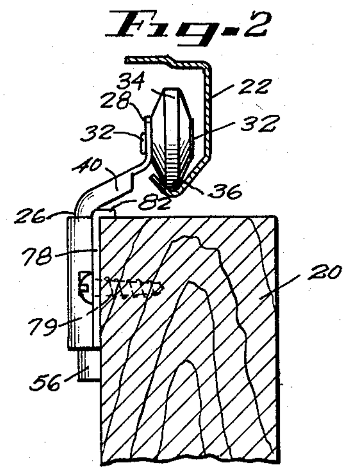
FIG. 2 is a side view in elevation of the hanger assembly of FIG. 1 taken along line 2—2 of FIG. 1.

Each of the three embodiments of the hanger assemblies, constructed in accordance with the principles of the present invention and appearing in the drawing, consists, in general, of three elements, i.e., a hanger carrying wheeled trolley means ridable in an overhead track, an attaching plate interlocked with the hanger and adapted for attachment to a sliding door, and screw means in engagement with the hanger and attaching plate for adjusting the height of the door and which acts on the hanger to move the hinger relative to the attaching plate, the screw means, hanger and adjusting plate being so arranged and constructed that the position of the hanger relative to the attaching plate can be adjusted when the attaching plate is in its final installation position on a door.

Although the present invention has a variety of applications, a suitable environment therefor appears in FIG. 1, which comprises a sliding door 20 and an overhead track 22. The door is shown as mounted in position for use with the track 22 by means of a hanger assembly which is generally indicated by the numeral 24 and which is constructed in accordance with the principles of the present invention.

The hanger assembly 24 comprises a hanger 26 carrying a bearing flange 28 offset but parallel to the body 30 of the hanger. In an aperture of the flange 28 is mounted a bearing axle 32 of a freely rotatable track wheel 34, which is adapted to ride in the groove 36 of the track 22.

Figure 3:
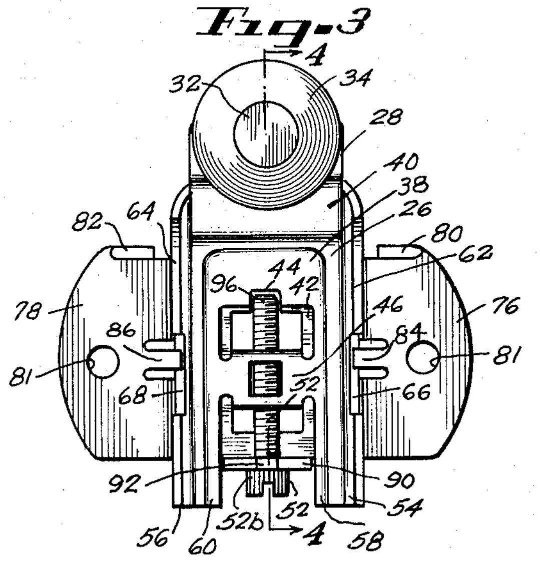
FIG. 3 is a rear view in elevation of the hanger assembly of FIG. 1.
Figure 4:
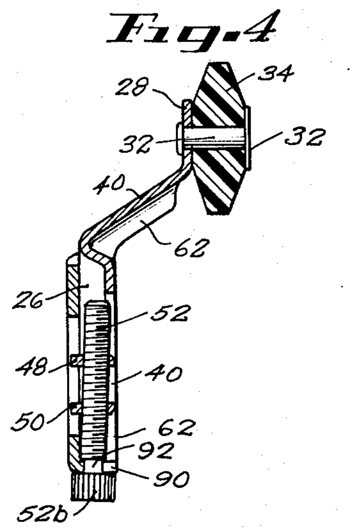
FIG. 4 is a view in section taken along line 4—4 of FIG. 3.

As appears in FIGS. 3 and 4 the body 30 of the hanger 26 has a depressed portion 38 in the upper central portion thereof and has a neck 40 which is bent angularly outwardly and upwardly from the plane of the body 30 and with which the flange 28 is integrally formed.

The depression 38 in the body is provided with a slot opening 42, as best appears in FIG. 3, and is provided with a recess 44 in the upper central portion thereof communicating with the opening 42 for purposes more fully described hereinafter.

Extending transversely across the body 30 and defining the lower side of the slot 42 is a strap 46 formed integrally with the body 30. The strap 46, as viewed in FIGS. 1 and 4, is provided with two outturned parallel flanges 48 and 50 extending normal to the body 30 in spaced relation to each other. These flanges 48 and 50 are coaxially bored and the bores threaded to receive in threaded engagement therewith door height adjusting means which takes the form of a screw 52. Preferably the screw 52 is a standard No. 6 screw with 32 threads per inch. By provision of such a screw thread a fine vertical adjustment of .032 of an inch for each revolution or turn of the screw 52 is achieved in order to reduce the pressure or torque required to adjust the position of the door relative to the track or floor, as is discussed more fully hereinafter.

The body 30 of the hanger includes two parallel and spaced members 54 and 56 which extend below the strap 46 and which include inner side walls 58 and 60 curved inwardly from the body 30 (FIG. 4). The marginal edges 62 and 64 of the hanger body 30, neck 40 and members 54 and 56 are bent inwardly to provide legs to space the hanger body from the door surface and are provided with notches 66 and 68 (FIG. 3).

Figure 5:
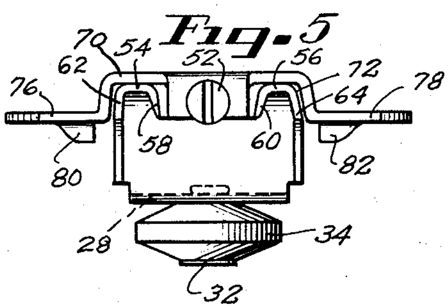
FIG. 5 is a bottom view in elevation of the hanger assembly of FIG. 1 taken along line 5—5 of FIG. 1.
Figure 6:
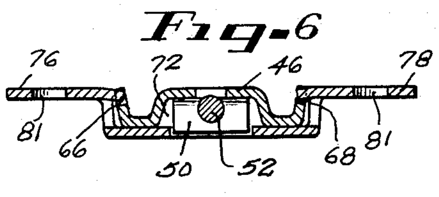
FIG. 6 is a view in section of the hanger assembly of FIG. 1 taken along line 6—6 of FIG. 1.

An attaching plate or strap 47 has an arched medial portion 70 forming a pocket 72 (FIG. 5) adapted to receive the body 30 of the hanger. The pocket 72 is provided with a centrally located opening 74 (FIG. 1) and oppositely disposed coplanar ends 76 and 78 each bored and adapted for attachment to the door by screws 79 which pass through openings 81 in the ends 76 and 78. The upper edges 80 and 82 of the ends 76 and 78 are turned inwardly to provide a pair of flanges which serve as a positioning means for the hanger assembly during installation thereof.

A pair of retaining tabs 84 and 86 for locking the hanger and plate 47 together are struck out from opposite edges of the attaching plate pocket 72 where the coplanar ends 76 and 78 join said pocket 72.

Prior to assembly of the plate 47 with the hanger 26, the tabs 84 and 86 extend angularly outwardly away from the attaching ends 76 and 78, but, during assembly, are bent over the edges of the body 30 of the hanger into the corresponding notches 66 and 68 into substantially the same plane as the ends when the device is fully assembled. The inturned tabs 84 and 86 thus prevent the hanger and attaching plate from separating.

When the plates are assembled, the flanges 48 and 50 ride in the slot 74 formed in the attaching plate as the screw 52 is threaded. As viewed in FIG. 1, the attaching plate has located on one end thereof and centrally of the arched medial portion, an inwardly extending screw bearing flange 90 which is located between the members 54 and 60 of the hanger and which is slotted to receive a reduced portion 92 of the adjusting screw 52 between the head 52*b* and the threaded shank 52*a* thereof. The slot in the flange 90 serves as a bearing surface and to align the screw 52 with the threaded bores in the strap 46 to prevent damage to the screw 52 which might otherwise occur by pressure applied in threading the screw in the tabs 48 and 50 of the strap plate 46 during movement of the hanger relative to the attaching plate during the door height adjusting operation.

During adjustment of the hanger, the tabs 84 and 86 serve as limit stops which abut the lower edges of the notches 66 and 68 when the screw 53 is threaded counterclockwise so that the hanger and adjusting plate are positioned relative to each other whereby the door is in its lower adjusted position.

To permit adjustment of the door relative to the floor or track so that the door is in its uppermost position, the screw 52 may be threaded clockwise until the tabs 84 and 86 abut the upper edges of the notches 66 and 68 of the hanger. The recess 44 formed in the hanger body 30 and communicating with the slot 42 of the hanger is provided to permit the end of the screw 96 to move to the position shown in FIG. 3 wherein the hanger and door are in their most proximate relative positions. It will be observed that, when the hanger assembly has been pre-assembled, when attached to a door, and when mounted to the track, the load or door weight is carried by the flanges 48 and 50, the threads of screw 52 in the apertures of these flanges 48 and 50, the flange 90 and the head 52*b* and threads of the adjusting screw 52.

When adjustment is required to raise the door, the adjusting screw 52 is turned in a clockwise direction in relation to the attaching plate thereby moving the hanger relative to the attaching plate to cause raising the door. When adjustment to lower the door is required, the adjusting screw 52 is turned in a counter-clockwise direction which permits the hanger to move in an upward direction relative to the attaching plate thereby allowing the door to be lowered.

In addition, it will be appreciated that the attaching plate may be first permanently mounted by screws 79 to the door and that it is unnecessary thereafter to loosen the screws 79 which are employed to attach the attaching plate to the door, in order to operate the screw 52 and thus permit adjustment of the height of the door. The arrangement appearing in FIGS. 1–6 of a hanger assembly facilitates installation thereof on a door and further facilitates installation of the hanger carried trolley wheel on to the track since by the simple expedient of attaching the pre-assembled hanger assembly to the door, by means of screws 79, the installer may seat the wheel in the track 36 and, thereafter, provide final alignment of the height of the door by operation of the screw 52 without the necessity for repeated assembly and dis-assembly of the hanger and plate, as was required with prior art devices.

In the embodiment of the present invention appearing in FIGS. 7–11 a screw 52 with a thread pitch longer than the pitch of the screw of FIGS. 1–6 is shown. The pitch of the screw thread of FIG. 7 may be eight to ten threads per inch. The body of the attaching plate 47 is provided with a recess 102 defined by radial arched upper and lower portions 104 and 105 and the hanger body 30 is provided with similar arcuate raised portions 108 and 110 at either side of a slot 112 which is stamped so that threads 114, 116 and 118 are formed which are in mesh with the teeth 52*a* of the screw 52. A retainer ring 120 slidably carried on the screw 52 limits the movement of the hanger relative to the attaching plate. In the embodiment appearing in FIGS. 7–11, the hanger assembly may be mounted by screws 79 to the door 20 in its final position and, by threading of the screw threads 52*a* relative to the thread tabs 114, 116 and 118, the height of the door relative to the floor or track may be adjusted, either upwardly or downwardly by threading the screw 52 either clockwise or counterclockwise in accordance with the method above described in connection with the embodiment of FIG. 1. Movement of the hanger assembly relative to the attaching plate 47 is limited in one direction by engagement of the ring 120 with the thread 114.

The tabs 114, 116 and 118 are coplanar with the body 30 of the hanger 26 and the raised arcuate portions 108 and 110 of the hanger and complementarily raised arcuate portions 104 and 105 of the attaching plate cooperate to position the screw 52 so that the threads thereof are engageable by the tabs 114, 116 and 118.

Figure 7:
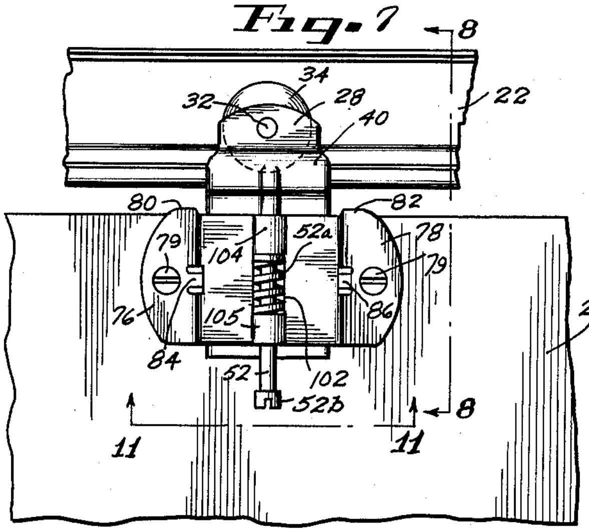
FIG. 7 is a view in elevation of an alternative embodiment of a hanger assembly of the present invention and illustrated as mounted on a sliding door and in position for use on a track.
Figure 8:
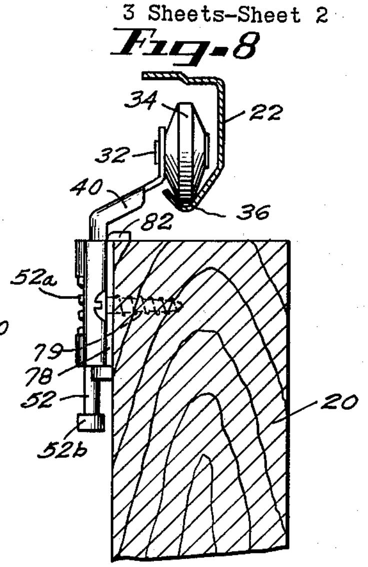
FIG. 8 is a side view in elevation of the hanger assembly of FIG. 7 taken along line 8—8 of FIG. 7.
Figure 9:
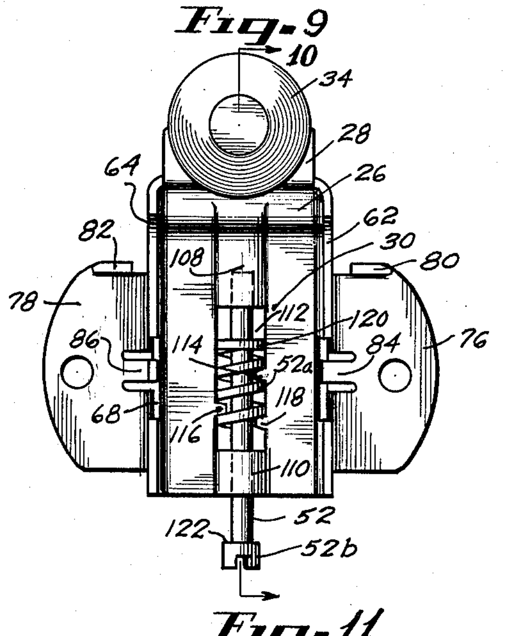
FIG. 9 is a rear view in elevation of the hanger assembly of FIG. 7.
Figure 10:
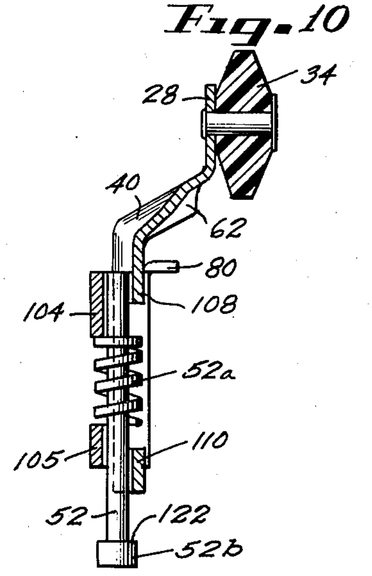
FIG. 10 is a side view in partial section taken along line 10—10 of FIG. 9.
Figure 11:
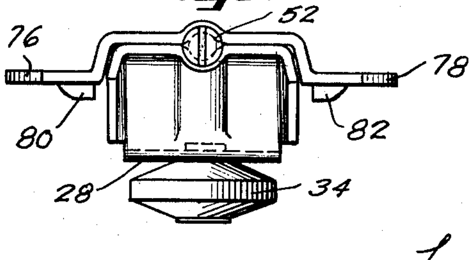
FIG. 11 is a view in elevation of the hanger assembly of FIG. 7 taken along line 11—11 of FIG. 7.

In assemblying the hanger assembly of FIG. 7, the screw 52 is positioned between the hanger and attaching body and the tabs 84 and 86 then bent over into the notch slots 66 and 68 to lock the attaching plate and hanger in assembled relation and to position the tabs 114, 116 and 118 in operating position adjacent the threads 52*a* of the screw 52.

It will be observed that the flanges 48 and 50 are not employed nor is the flange 90 thus simplifying the construction of the hanger assembly.

In the embodiment of the present invention appearing in FIGS. 12–17, the attaching plate 47 is provided with centrally located and axially aligned arcuate raised portions 130 and 132 (FIG. 12) which complement a raised channel 134 (FIG. 14) centrally located in the hanger body 30. The raised portion 134 has a slot 136 therein as best appears in FIG. 15 to receive and hold therein against rotation a nut 140 through which the screw 52 is threaded. The nut 140 is prevented from axial movement with the screw 52 by the shoulders provided by the hanger slot defining walls.

The screw 52 is not threaded to the complementarily ribbed surfaces or portions 136, 130 and 132 of the hanger and attaching plate respectively.

The attaching plate 47 carries an apertured flange 142 extending normal thereto (FIG. 14) and through which the shank of the screw 52 extends to guide movement of the screw and prevent translation thereof during operation of the screw to adjust the hanger vertically relative to the adjusting plate. In addition, the guide flange 142 acts as a stop for the shoulder 122 of the head 52*b* of the screw.

In operation, the hanger is assembled to the attaching plate in the manner above described in connection with the manner of assembling the hanger and attaching plate of the embodiment of FIG. 1 with the nut 140 and screw 52 aligned with the raised portions 130, 132 and 136 of the attaching plate and hanger respectively so that when the tabs 84 and 86 are bent over into the notches 68 and 66 the nut 140 will be locked in place against rotation and movement with the screw and the screw will be in place for threading relative to the nut 140. Of course, the screw is pre-assembled through the aperture in the guide flange 142 (FIG. 14) before the hanger and adjusting plate are assembled.

Figure 12:
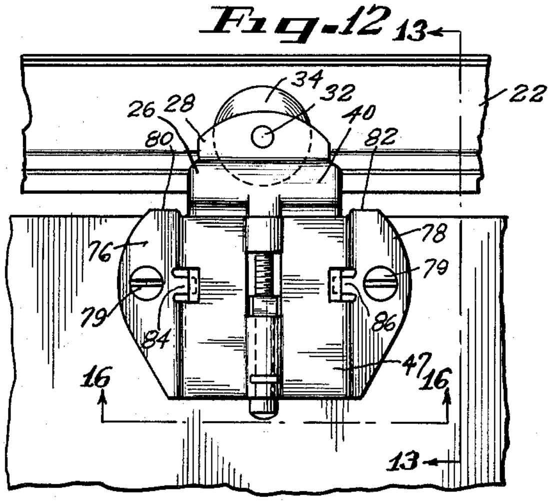
FIG. 12 is a view in elevation of an alternate embodiment of the present invention illustrated as mounted to a sliding door and in position for use on a track.
Figure 13:
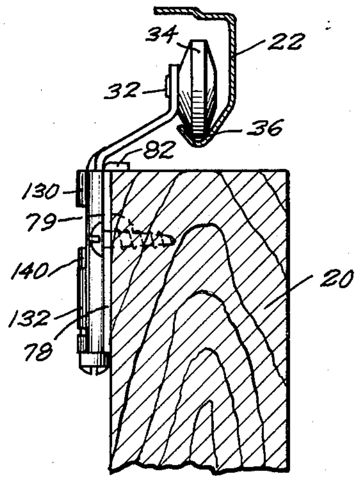
FIG. 13 is a side view in elevation of the hanger assembly of FIG. 12 taken along line 13—13 of FIG. 12.
Figure 14:
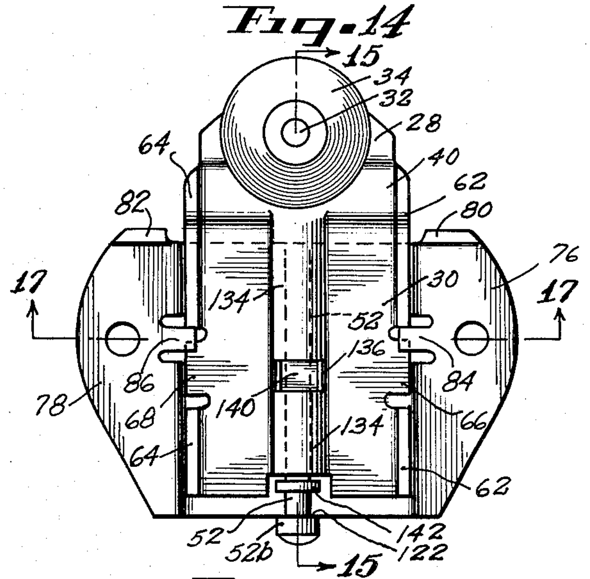
FIG. 14 is a rear view of the hanger assembly of FIG. 12.
Figure 15:
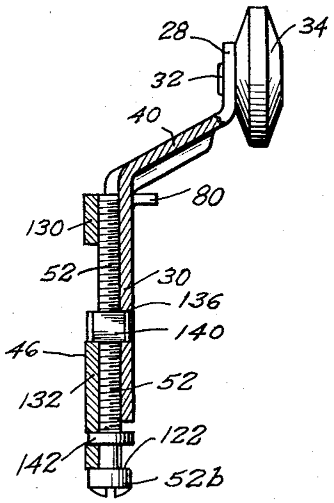
FIG. 15 is a view in partial section taken along lines 15—15 of FIG. 14.
Figure 16:
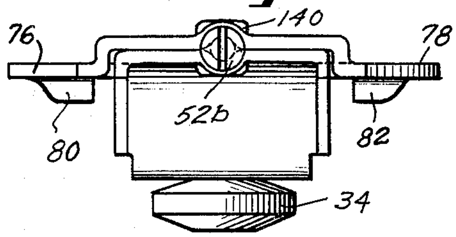
FIG. 16 is an end view of the hanger assembly FIG. 12 taken along line 16—16 of FIG. 12.
Figure 17:
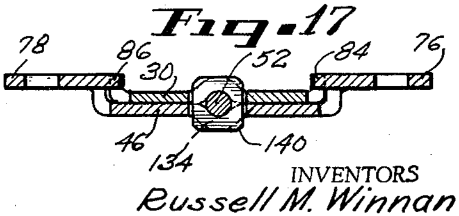
FIG. 17 is a view in section taken along line 17—17 of FIG. 14.

After the tabs 86 and 84 are bent into the slots 68 and 66, the attaching plate is mounted by screws 79 to the door 20 (FIG. 12). The wheel 34 is then mounted in the track 22. To adjust the height of the door relative to the track 22 or floor, the screw 52 is threaded through the nut 140 to move the hanger 26 relative to the attaching plate 47, either upwardly or downwardly to the door 20 (FIG. 12).

It will be noted that in the embodiment of the present invention appearing in FIGS. 12–17, the attaching plate 47 may be permanently mounted to the door by the screws 79 which need not thereafter be employed in the door height adjusting operation, the screw 52 and its cooperative relationship with the parts of the hanger and attaching plate heretofore mentioned cooperating upon threading of the screw to adjust the height of the door 20.

Although various minor modifications and alterations of the present invention will become readily apparent to those versed in the art, it should be understood that what is intended to be covered by the patent warranted hereon are all such embodiments as reasonably and properly come within the scope of the contribution to the art hereby made.

We claim:

1. A hanger unit adapted for mounting sliding doors on a track comprising: a hanger plate carrying means rideable in said track and having opposite side flanges offset from the same side of the plate to provide a space between the inner side of the plate and the door when said plate is assembled in said unit, a door attaching plate having door attaching ends and a medial arched portion forming a hanger plate receiving pocket, first means for locking the attaching plate in overlying assembled engagement with the hanger plate in said pocket, said means permitting limited movement of the hanger plate relative to the longitudinal axis of the attaching plate, threaded means formed integral with the hanger plate projecting into the pocket of said attaching plate, and threadable means carried by said hanger plate in threaded engagement with said threaded means and in a position between said plates in said pocket of said attaching plate, said threadable means being accessible from the exterior of said unit for threading thereof about the longitudinal axis of the hanger plate to move the hanger plate axially relative to said attaching plate, said hanger plate having an axial slot therein, said attaching plate having a complementary slot therein, both said threaded means and said threadable means being in engagement in said slots, said threaded means comprising a plurality of spaced teeth extending from said hanger plate into said hanger plate slot for meshing engagement with said threadable means, and means carried by said threadable means for contact with said attaching plate for preventing longitudinal movement of said threadable means so as to cause the hanger plate to move on said threadable means.

2. The unit of claim 1 wherein said first means includes a notch in each of said flanges of the hanger plate and tabs struck out from the attaching plate adjacent the arched portion thereof to ride in the corresponding notch for locking said attaching plate and said hanger plate in assembled relation.

3. The unit of claim 2 wherein said notches are medially located in said flanges of said hanger plate.

References Cited by the Examiner

UNITED STATES PATENTS

| | | | |
|---|---|---|---|
| Re. 25,246 | 9/62 | Majeske | 16—105 |
| 299,156 | 5/84 | Moore | 16—105 |
| 862,561 | 8/07 | Hunt | 16—105 |
| 890,950 | 6/08 | Washburn | 16—105 |
| 1,663,428 | 3/28 | Viberg | 16—105 |
| 2,480,438 | 8/49 | Bergman et al. | 8—49 |
| 2,668,318 | 2/54 | Lee Bon | 16—105 X |
| 2,999,267 | 9/61 | Sterling et al. | 16—105 |
| 3,041,657 | 7/62 | McNinch | 16—105 |
| 3,058,178 | 10/62 | Brydolf | 16—105 |

DONLEY J. STOCKING, *Primary Examiner.*

BOBBY R. GAY, *Examiner.*